(12) United States Patent
Ge

(10) Patent No.: US 12,045,411 B2
(45) Date of Patent: Jul. 23, 2024

(54) ELECTROMAGNETIC TOUCH DISPLAY PANEL

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventor: Ru Ge, Guangdong (CN)

(73) Assignees: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/595,668

(22) PCT Filed: Oct. 29, 2021

(86) PCT No.: PCT/CN2021/127455
§ 371 (c)(1),
(2) Date: Nov. 22, 2021

(87) PCT Pub. No.: WO2023/070528
PCT Pub. Date: May 4, 2023

(65) Prior Publication Data
US 2024/0036673 A1 Feb. 1, 2024

(30) Foreign Application Priority Data
Oct. 25, 2021 (CN) .......................... 202111243182.1

(51) Int. Cl.
*G06F 3/041* (2006.01)

(52) U.S. Cl.
CPC .......... *G06F 3/0416* (2013.01); *G06F 3/0412* (2013.01)

(58) Field of Classification Search
CPC ............................ G06F 3/0416; G06F 3/0412
See application file for complete search history.

(56) References Cited

U.S. PATENT DOCUMENTS 10,732,752 B1 * 8/2020 Zhu ...................... G06F 3/0416
10,741,127 B2 * 8/2020 Huang .................... H01L 27/13
(Continued)

FOREIGN PATENT DOCUMENTS

| CN | 102955639 A | 3/2013 |
| CN | 104252279 A | 12/2014 |

(Continued)

OTHER PUBLICATIONS

International Search Report in International application No. PCT/CN2021/127455, mailed on Jul. 26, 2022.
(Continued)

*Primary Examiner* — William Lu

(57) ABSTRACT

An electromagnetic touch display panel is provided. The electromagnetic touch display panel includes: a substrate having a display area and a binding area, a circuit board disposed in the binding area and including a first signal terminal and a second signal terminal, a display trace extending from the display area to the binding area and connected to the first signal terminal for transmitting a display signal, and an antenna trace extending from the display area to the binding area and connected to the second signal terminal for transmitting an antenna signal.

13 Claims, 6 Drawing Sheets

(56) References Cited

U.S. PATENT DOCUMENTS

| | | | |
|---|---|---|---|
| 11,494,025 B2* | 11/2022 | Kim | H01Q 1/526 |
| 2013/0093680 A1* | 4/2013 | Ogita | G06F 1/1626 |
| | | | 345/174 |
| 2014/0210711 A1* | 7/2014 | Liu | G06F 3/0416 |
| | | | 345/157 |
| 2014/0362012 A1* | 12/2014 | Lee | G06F 3/046 |
| | | | 345/173 |
| 2016/0209944 A1* | 7/2016 | Shim | G06F 3/04166 |
| 2016/0378238 A1* | 12/2016 | Kwong | G06F 3/0416 |
| | | | 345/173 |
| 2017/0179168 A1* | 6/2017 | Suzuki | G02F 1/133553 |
| 2017/0237152 A1* | 8/2017 | Lee | H01Q 5/357 |
| | | | 343/702 |
| 2017/0263179 A1* | 9/2017 | Aurongzeb | G06F 1/183 |
| 2017/0285844 A1* | 10/2017 | Park | G06F 1/1647 |
| 2017/0288298 A1* | 10/2017 | Kim | G06F 1/1635 |
| 2018/0173354 A1 | 6/2018 | Abe et al. | |
| 2018/0254801 A1* | 9/2018 | Suzuki | G06F 3/0416 |
| 2018/0261152 A1* | 9/2018 | Singh | G09G 3/3225 |
| 2019/0220123 A1* | 7/2019 | Kanaya | H10K 59/40 |
| 2020/0019264 A1* | 1/2020 | Kadota | H10K 59/40 |
| 2020/0033968 A1* | 1/2020 | Yamagishi | G06F 3/04162 |
| 2020/0153115 A1* | 5/2020 | Yun | G06F 3/0412 |
| 2020/0192542 A1* | 6/2020 | Chang | G09G 3/3225 |
| 2020/0241671 A1* | 7/2020 | Cheng | H01Q 1/44 |
| 2021/0027722 A1* | 1/2021 | Rao | G06F 3/0412 |
| 2021/0181888 A1* | 6/2021 | Yan | G06F 3/0445 |
| 2021/0247871 A1* | 8/2021 | Kim | H01Q 1/44 |

FOREIGN PATENT DOCUMENTS

| | | |
|---|---|---|
| CN | 105468202 A | 4/2016 |
| CN | 109935173 A | 6/2019 |
| CN | 110580118 A | 12/2019 |
| CN | 111045548 A | 4/2020 |
| CN | 111243486 A | 6/2020 |
| CN | 111399290 A | 7/2020 |
| CN | 111708464 A | 9/2020 |
| CN | 111919164 A | 11/2020 |
| CN | 112162662 A | 1/2021 |
| CN | 112651264 A | 4/2021 |
| CN | 112684927 A | 4/2021 |
| CN | 112863442 A | 5/2021 |
| CN | 113161401 A | 7/2021 |
| CN | 113176835 A | 7/2021 |
| CN | 113327516 A | 8/2021 |
| CN | 113380144 A | 9/2021 |
| WO | 2021003849 A1 | 1/2021 |

OTHER PUBLICATIONS

Written Opinion of the International Search Authority in International application No. PCT/CN2021/127455, mailed on Jul. 25, 2022.

Chinese Office Action issued in corresponding Chinese Patent Application No. 202111243182.1 dated Jan. 16, 2024, pp. 1-10.

* cited by examiner

ELECTROMAGNETIC TOUCH DISPLAY PANEL

FIELD OF INVENTION

The present disclosure relates to the field of display technologies, and in particular, to an electromagnetic touch display panel.

BACKGROUND OF INVENTION

In recent years, touch technologies have been widely applied to various electronic products in daily work and life. Since users may input information to a touch screen directly by means of touching with hands or other objects, the users are less or even no longer dependent on other input devices (such as a keyboard, a mouse, or a remote control). facilitating operations for the users. The touch screen includes an electromagnetic touch screen, a capacitive touch screen, a resistive film touch screen, and the like. In the electromagnetic touch screen, a coil in a particular electromagnetic pen causes an electromagnetic induction coil on the touch screen to produce magnetic field variation, so as to generate weak electric current. For touch detection, a touch point position is calculated.

The electromagnetic touch screen in the prior art generally adopts an externally mounted electromagnetic touch panel. The externally mounted electromagnetic touch panel is combined with a display panel to form the electromagnetic touch screen. The electromagnetic touch screen is overall relatively thick and has complex lines, causing a waste of costs.

SUMMARY OF INVENTION

Technical Problem

The present invention is intended to provide an electromagnetic touch display panel, to resolve the technical problem that an externally mounted electromagnetic touch screen is relatively thick and costly.

Technical Solution

In order to achieve the foregoing purpose, the present invention provides an electromagnetic touch display panel. The electromagnetic touch display panel includes: a substrate, including a display area and a binding area; a circuit board, disposed in the binding area and including a first signal terminal and a second signal terminal; a display trace, extending from the display area to the binding area and connected to the first signal terminal for transmitting a display signal; and an antenna trace, extending from the display area to the binding area and connected to the second signal terminal for transmitting an antenna signal.

Further, the antenna trace includes: at least one first antenna; and at least one second antenna, intersecting and insulated from the first antenna.

Further, the second signal terminal includes: a first touch signal terminal, connected to the first antenna; and a second touch signal terminal, connected to the second antenna. The first touch signal terminal and the second touch signal terminal are located on two sides of the first signal terminal.

Further, the first antenna includes: more than two first sub-antennas, each vertically or bendably extending in the binding area, extending in the display area in a vertical direction, and arranged at intervals in a horizontal direction; and one first main antenna, bendably extending in the binding area, extending in the display area in a horizontal direction, and close to an edge of the display area The more than two first sub-antennas are all connected to the first main antenna to form a first antenna loop.

Further, the second antenna includes: more than two second sub-antennas, each bendably extending in the binding area, extending in the display area in a horizontal direction, and arranged at intervals in a vertical direction; and a second main antenna, bendably extending in the binding area, extending in the display area in a vertical direction, and close to an edge of the display area. The more than two second sub-antennas are all connected to the second main antenna to form a second antenna loop.

Further, the circuit board includes: at least one first circuit unit and a plurality of second circuit units disposed on two sides of the first circuit unit, and the first circuit unit and the second circuit units each include the first signal terminal and the second signal terminal. The antenna trace is connected to the second signal terminal of the first circuit unit and the second signal terminals of the second circuit units.

Further, the circuit board includes: at least one first circuit unit and a plurality of second circuit units disposed on two sides of the first circuit unit, the first circuit unit includes the first signal terminal, and the second circuit units each include the first signal terminal and the second signal terminal. The antenna trace is connected to the second signal terminals of the second circuit units.

Further, the circuit board further includes: at least one third circuit unit, disposed on a side of each second circuit unit that is away from the first circuit unit. The third circuit unit includes a third signal terminal and a fourth signal terminal, and the third signal terminal and the fourth signal terminal are both connected to the display trace.

Further, the electromagnetic touch display panel includes a scan driving unit disposed on a side edge of the display area and connected to the circuit board. The display trace includes: at least one data line; and at least one scanning line, intersecting and insulated from the data line, the data line is connected to the first signal terminal and the third signal terminal. The scanning line is connected to the scan driving unit. The scan driving unit is connected to the fourth signal terminal.

Further, a line layer of the first circuit unit, a line layer of the second circuit unit, and a line layer of the third circuit unit are disposed in a same layer.

Further, a line layer of the first circuit unit and a line layer of the second circuit unit are disposed in a same layer, and the line layer of the first circuit unit and a line layer of the third circuit unit are disposed in different layers. A height difference between the line layer of the third circuit unit and the line layer of the first circuit unit is less than 3 μm.

Beneficial Effects

Compared with the prior art, according to the electromagnetic touch display panel provided in the present disclosure, the circuit board includes the first signal terminal and the second signal terminal, the first signal terminal is connected to the data line of the display trace for transmitting the display signal, realizing display function of the display panel, and the second signal terminal is connected to the antenna trace for transmitting the antenna signal, realizing the electromagnetic touch function of the display panel. In this way, the cost of hand input to the display panel is reduced, and the integration of the display panel is enhanced.

BRIEF DESCRIPTION OF DRAWINGS

The following describes specific implementations of the present disclosure in detail with reference to the accompanying drawings, to make the technical solutions and other beneficial effects of the present disclosure obvious.

The components of the drawings are identified as follows:
100. Substrate; 10. Display area;
20. Non-display area; 201. Frame area;
202. Binding area; 300. Scan driving unit;
110. Circuit board; 110a. First circuit unit;
110b. Second circuit unit; 110c. Third circuit unit;
30. Display trace; 40. Antenna trace;
50. First signal terminal; 60. Second signal terminal;
70. Third signal terminal; 80. Fourth signal terminal;
301. Data line; 302. Scanning line;
401. First antenna; 402. Second antenna;
601. First touch signal terminal; 602. Second touch signal terminal;
4011. First sub-antenna; 4012. First main antenna;
4021. Second sub-antenna; 4022. Second main antenna;
101. First metal layer; 102. Insulating layer;
103. Second metal layer.

DETAILED DESCRIPTION OF PREFERRED EMBODIMENTS

The following clearly and completely describes technical solutions in embodiments of the present disclosure with reference to the accompanying drawings in the embodiments of the present disclosure.

In the description of the present disclosure, it can be understood that, terms "first" and "second" are used only for a purpose of description, and shall not be construed as indicating or implying relative importance or implying a quantity of indicated technical features. Thus, features defined by "first" and "second" may explicitly or implicitly include one or more of the features. In the descriptions of the present disclosure, "a plurality of" means two or more, unless otherwise definitely and specifically limited. In addition, the terms such as "connect", and "connection" should be understood in a broad sense. For example, the connection may be a fixed connection, a detachable connection, or an integral connection; a mechanical connection, an electrical connection, mutual communication, a direct connection, an indirect connection through an intermediate, or internal communication between two elements or an interaction relationship between two elements. A person of ordinary skill in the art may understand the specific meanings of the foregoing terms in the present disclosure according to specific situations.

Figure 1:
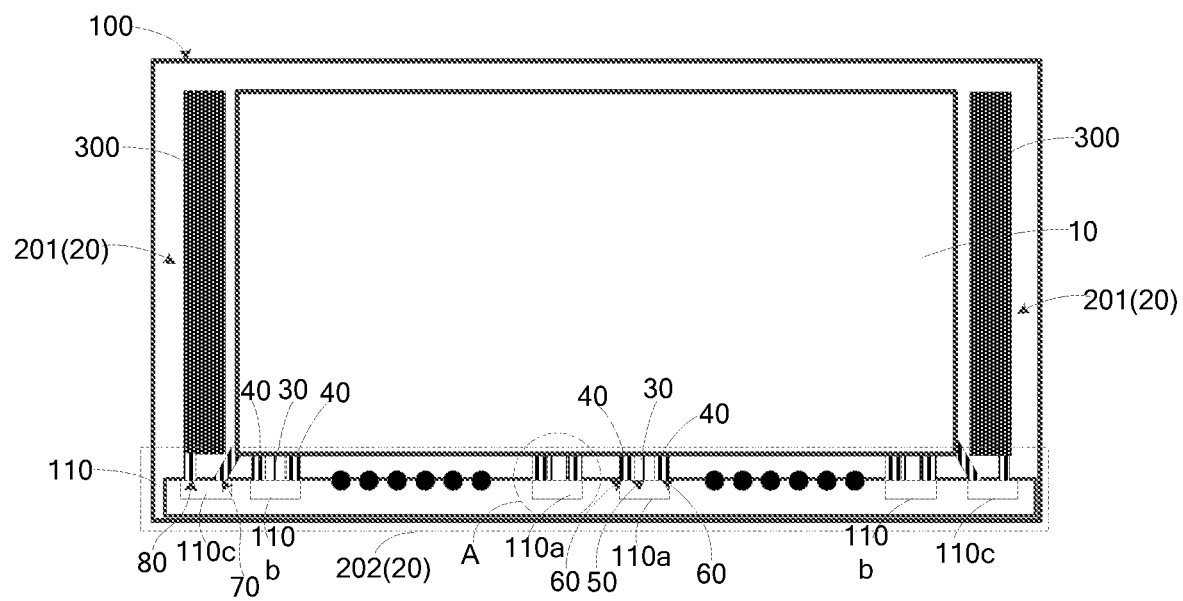
FIG. 1 is a planar view of an electromagnetic touch display panel according to Embodiment 1 of the present disclosure.

Embodiments of the present disclosure provide an electromagnetic touch display panel. As shown in FIG. 1, the electromagnetic touch display panel includes a substrate 100. The substrate 100 includes a display area 10 and a non-display area 20 surrounding the display area 10. The non-display area 20 includes a frame area 201 and a binding area 202. The frame area 201 is disposed on two side edges of the display area 10 that are disposed opposite to each other. The binding area 202 is disposed on a side of the non-display area 20 except for the frame area 201, that is, under the display area 10.

The electromagnetic touch display panel further includes a circuit board 110, a display trace 30, and an antenna trace 40.

The circuit board 110 is disposed in the binding area 202. The circuit board 110 includes a first signal terminal 50 and a second signal terminal 60. The display trace 30 extends from the display area 10 to the binding area 202 and is connected to the first signal terminal 50 for transmitting a display signal. The antenna trace 40 extends from the display area 10 to the binding area 202 and is connected to the second signal terminal 60 for transmitting an antenna signal. In the present embodiment of the present disclosure, the first signal terminal 50 is connected to a data line 301 of the display trace 30 for transmitting the display signal, realizing the display function of the display panel, and the second signal terminal 60 is connected to the antenna trace 40 for transmitting the antenna signal, realizing the electromagnetic touch function of the display panel. In this way, the cost of hand input to the display panel is reduced, and the integration of the display panel is enhanced. Detailed description is provided below by way of embodiments.

Embodiment 1

As shown in FIG. 1, the present embodiment provides an electromagnetic touch display panel. A circuit board 110 includes a first circuit unit 110a, a second circuit unit 110b, and a third circuit unit 110c.

In detail, at least one first circuit unit 110a is disposed between two second circuit units 110b. The third circuit unit 110c is disposed on a side of the second circuit unit 110b that is away from the first circuit unit 110a.

The first circuit unit 110a and the second circuit units 110b each include a first signal terminal 50 and a second signal terminal 60. The first signal terminal 50 is connected to a display trace 30. The second signal terminal 60 is connected to an antenna trace 40. The third circuit unit 110c includes a third signal terminal 70 and a fourth signal terminal 80. The third signal terminal 70 and the fourth signal terminal 80 are both connected to the display trace 30.

The display trace 30 extends from the display area 10 to the binding area 202 and is connected to the first signal terminal 50 for transmitting a display signal, realizing the display function of the display panel.

The electromagnetic touch display panel includes a scan driving unit 300. The scan driving unit 300 is disposed on a side edge of the display area 10, and is connected to the circuit board 110.

Figure 2:
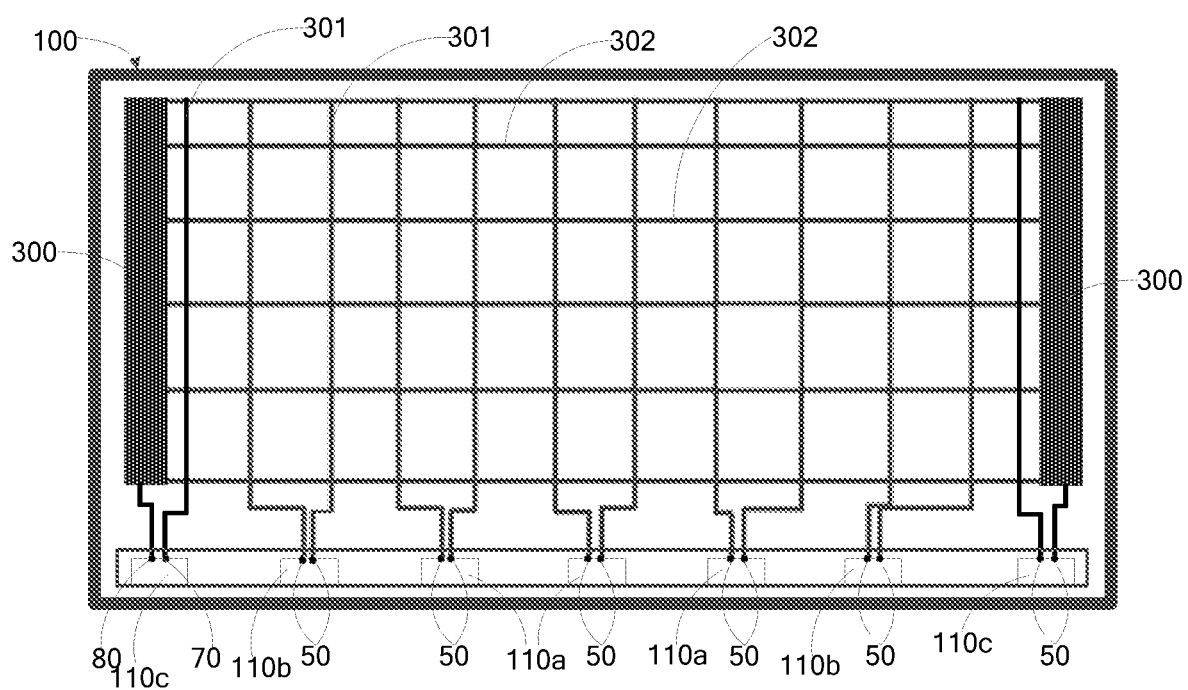
FIG. 2 is a schematic diagram of a structure of a display trace according to Embodiment 1 of the present disclosure.

As shown in FIG. 2, the display trace 30 includes at least one data line 301 and at least one scanning line 302. The scanning line 302 intersects and is insulated from the data line 301. In detail, more than two data lines 301 parallel to each other extend in a vertical direction, and are arranged at intervals in a horizontal direction. More than two scanning lines 302 parallel to each other extend in a horizontal direction, and are perpendicular to the data lines 301 and arranged at intervals in a vertical direction. In the present embodiment, the data lines 301 are connected to the first signal terminal 50 and the third signal terminal 70 for transmitting a data signal. The scanning lines 302 are connected to the scan driving unit 300 for transmitting a scanning signal.

Still referring to FIG. 1, the antenna trace 40 extends from the display area 10 to the binding area 202 and is connected to the second signal terminal 60 for transmitting an antenna signal, realizing the electromagnetic touch function of the display panel. In this way, the cost of hand input to the display panel is reduced, and the integration of the display panel is enhanced.

Figure 3:
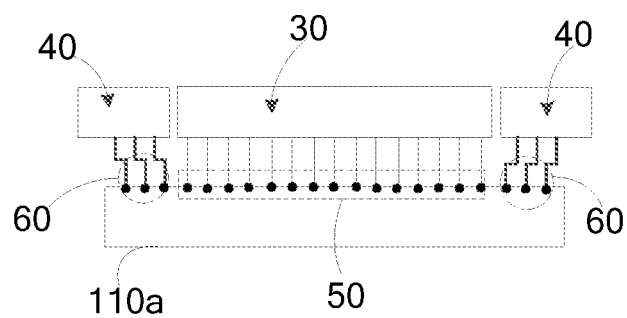
FIG. 3 is a partial enlarged view of A in FIG. 1.
Figure 4:
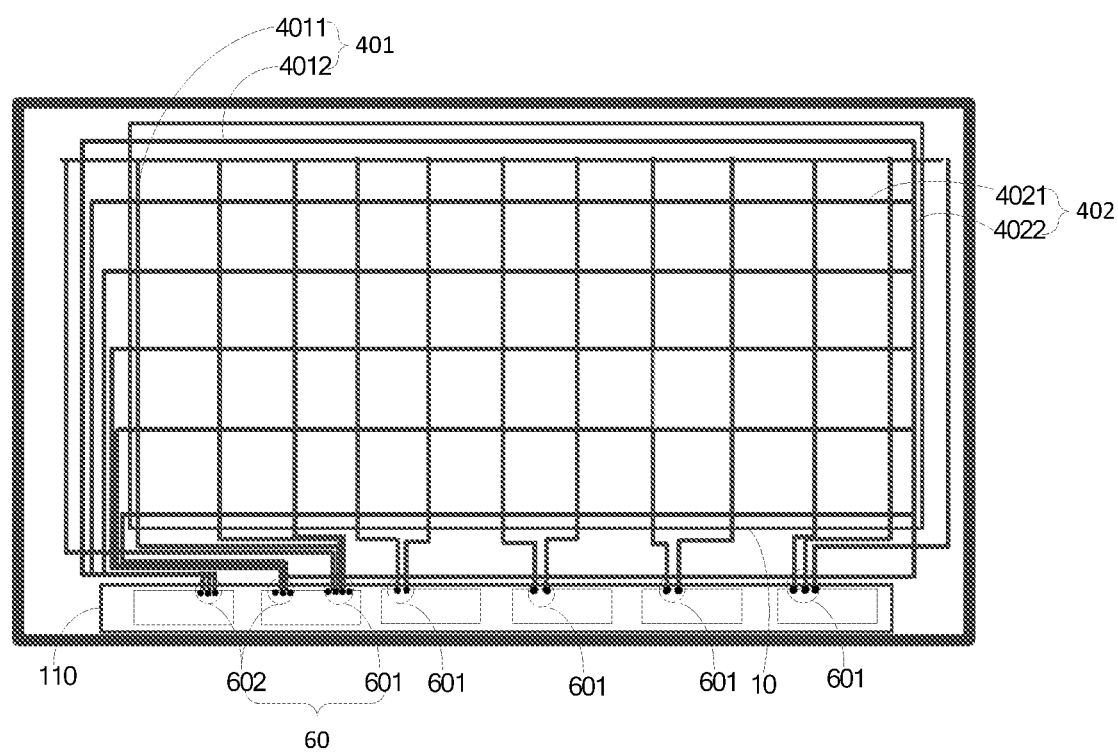
FIG. 4 is a schematic diagram of a structure of an antenna trace according to Embodiment 1 of the present disclosure.

As shown in FIGS. 3 to 4, the antenna trace 40 includes at least one first antenna 401 and at least one second antenna 402. The second antenna 402 intersects and is insulated from the first antenna 401.

The first antenna 401 includes more than two first sub-antennas 4011 and one first main antenna 4012.

The first sub-antennas 4011 vertically or bendably extend in the binding area 202, extend in the display area 10 in a vertical direction, and are arranged at intervals in a horizontal direction. The first main antenna 4012 bendably extends in the binding area 202, extends in the display area 10 in a horizontal direction, and is close to a right side edge of the display area 10. The more than two first sub-antennas 4011 are all connected to the first main antenna 4012 to form a first antenna 401 loop. Therefore, the wiring space of the first antenna 401 in the display area 10 is reduced.

The second antenna 402 includes more than two second sub-antennas 4021 and one second main antenna 4022.

The second sub-antennas 4021 bendably extend in the binding area 202, extend in the display area 10 in a horizontal direction, and are arranged at intervals in a vertical direction. The second main antenna 4022 bendably extends in the binding area 202, extends in the display area 10 in a vertical direction, and is close to an edge of the display area 10. The more than two second sub-antennas 4021 are connected to the second main antenna 4022 to form a second antenna 402 loop. Therefore, the wiring space of the second antenna 402 in the display area 10 is reduced.

According to the present embodiment, the first antenna 401 loop and the second antenna 402 loop are disposed, not only reducing the wiring space of antennas in the display area 10, but also reducing the cost of hand input to the display panel and enhancing the integration of the display panel.

Further, the second signal terminal 60 includes a first touch signal terminal 601 and a second touch signal terminal 602.

The first touch signal terminal 601 is connected to the first antenna 401. The second touch signal terminal 602 is connected to the second antenna 402. The first touch signal terminal 601 and the second touch signal terminal 602 are located on two sides of the first signal terminal (refer to FIG. 1).

Still referring to FIG. 1, in the present embodiment, the antenna trace 40 is connected to the second signal terminal 60 of the first circuit unit 110a and the second signal terminals 60 of the second circuit units 110b. In detail, the second signal terminals 60 are uniformly disposed in the first circuit unit 110a and the second circuit unit 110b. The first circuit unit 110a has a same structure as the second circuit unit 110b.

Still referring to FIG. 1, in the present embodiment, two third circuit units 110c are respectively disposed on sides of the second circuit units 110b that are away from the first circuit unit 110a. Each third circuit unit 110c includes a third signal terminal 70 and a fourth signal terminal 80. The third signal terminal 70 and the fourth signal terminal 80 are both connected to the display trace 30. As shown in FIG. 2, the third signal terminal 70 is connected to the data line 301 and the fourth signal terminal 80 is connected to the scan driving unit 300 for optimizing the transmission of the display signal of the display panel.

It is to be noted that, the first circuit unit 110a, the second circuit unit 110b, and the third circuit unit 110c each are a chip on film (COF).

In the present embodiment, a line layer of the first circuit unit 110a, a line layer of the each second circuit unit 110b, and a line layer of the each third circuit unit 110c are disposed in a same layer.

Figure 5:
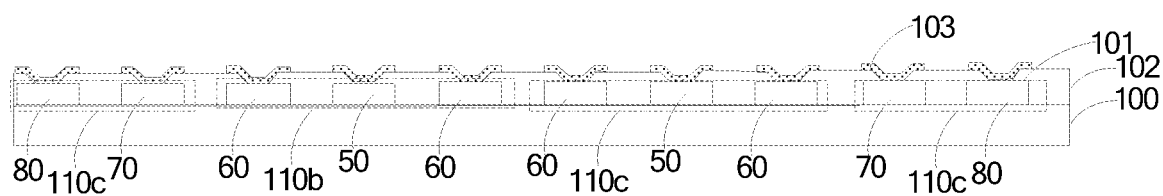
FIG. 5 is a cross-sectional view of the electromagnetic touch display panel according to Embodiment 1 of the present disclosure.

In detail, as shown in FIG. 5, the electromagnetic touch display panel includes a substrate 100, a first metal layer 101, an insulating layer 102, and a second metal layer 103.

The first metal layer 101 is formed on the substrate 100 by means of patterning. The first metal layer 101 is patterned to form the first signal terminal 50, the second signal terminal 60, the third signal terminal 70, and the fourth signal terminal 80. Compared with the prior art, in the present embodiment, the touch function and the display function are integrated in the same layer, and can be realized using the idle terminals of the circuit units. Therefore, an inductive touch screen can be thinner and can have simple lines, thereby effectively reducing the production cost.

The insulating layer 102 is disposed on the first metal layer 101 and the substrate 100 for flattening the first metal layer 101 and insulating adjacent signal terminals from each other.

The second metal layer 103 is formed on the insulating layer 102 by means of patterning, and is connected to the first signal terminal 50, the second signal terminal 60, the third signal terminal 70, the fourth signal terminal 80, and a fifth signal terminal. The second metal layer 103 is patterned to form the first antenna 401, the second antenna 402, the data line 301, and the scanning line 302. The touch function of the display panel is realized using the first antenna 401 and the second antenna 402. The display function of the display panel is realized using the data line 301 and the scanning line 302.

According to the electromagnetic touch display panel provided in the present embodiment, the first circuit unit 110a and the second circuit unit 110b both have the first signal terminal 50 and the second signal terminal 60 disposed thereon. The first signal terminal 50 transmits the display signal (a data signal) to realize the display function of the display panel. The second signal terminal 60 transmits the antenna signal to realize the electromagnetic touch function of the display panel. In this way, the cost is reduced, and the integration of the display panel is enhanced. Compared with the electromagnetic touch screen in the prior art, in the present embodiment, the touch function and the display function may be integrated in the same layer, and can be realized using the idle terminals of the circuit units. Therefore, an inductive touch screen can be thinner and can have simple lines, thereby effectively reducing the production cost.

Embodiment 2

The present embodiment provides an electromagnetic touch display panel. The electromagnetic touch display panel includes most of the technical solutions in Embodiment 1, except that the second signal terminal 60 is disposed in only the second circuit unit 110b.

Figure 6:
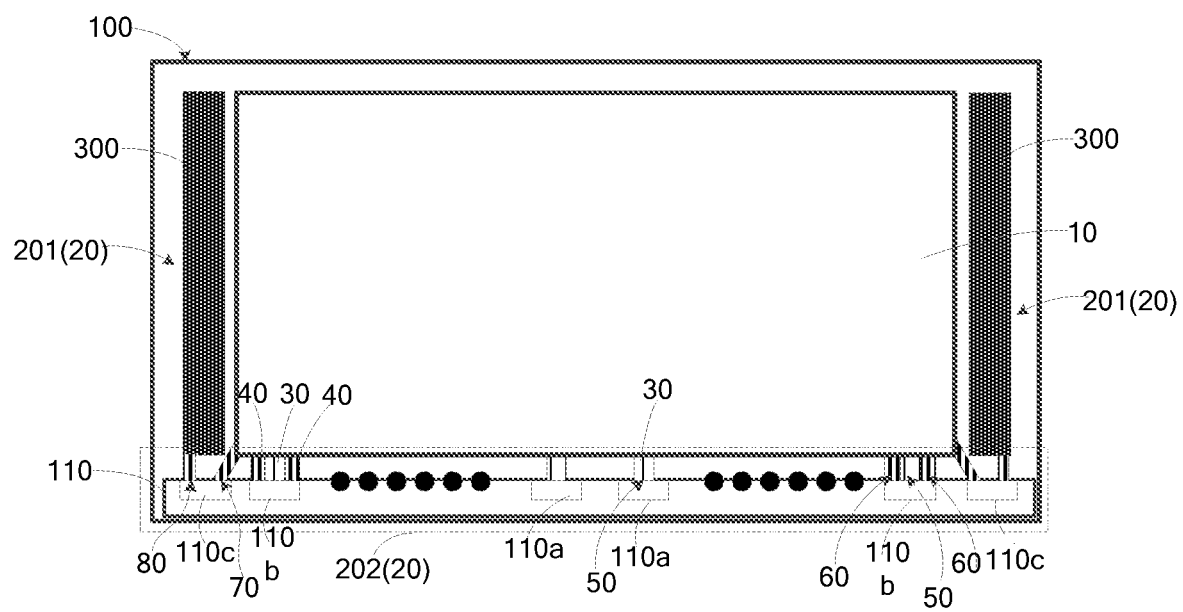
FIG. 6 is a planar view of an electromagnetic touch display panel according to Embodiment 2 of the present disclosure.

As shown in FIG. 6, at least one first circuit unit 110a and a plurality of second circuit units 110b disposed on two sides of each first circuit unit 110a are included. The first circuit unit 110a includes the first signal terminal 50. Each second circuit unit 110b includes the first signal terminal 50 and the second signal terminal 60. The antenna trace 40 is connected to the second signal terminal 60 of the second circuit unit 110b. That is to say, most first signal terminals 50 are disposed in the middle of the binding area 202, few first signal terminals 50 are disposed on the side of the binding area 202, and all of the second signal terminals 60 are disposed on the side of the binding area 202. In this way, not only the display function of the display panel can be realized, but also the integration of the display panel can be enhanced. Compared with the electromagnetic touch screen in the prior art, in the present embodiment, the touch function and the display function may be integrated in the same layer, and can be realized using the idle terminals of the circuit units. Therefore, an inductive touch screen can be thinner and can have simple lines, thereby effectively reducing the production cost.

Embodiment 3

The present embodiment provides an electromagnetic touch display panel. The electromagnetic touch display panel includes most of the technical solutions in Embodiment 1 or Embodiment 2, except that the line layer of the first circuit unit and the line layer of the second circuit unit are disposed in the same layer, and the line layer of the first circuit unit and the line layer of the third circuit unit are disposed in different layers (not shown in the figure). A height difference between the line layer of the third circuit unit and the line layer of the first circuit unit is less than 3 μm. Definitely, in other embodiments, the line layer of the first circuit unit and the line layer of the third circuit unit are disposed in the same layer, and the line layer of the first circuit unit and the line layer of the second circuit unit are disposed in different layers. Details are not enumerated herein again.

According to the electromagnetic touch display panel provided in the present embodiment of the present disclosure, the first circuit unit and the second circuit unit both have the first signal terminal and the second signal terminal disposed thereon. The first signal terminal transmits the display signal (a data signal) to realize the display function of the display panel. The second signal terminal transmits the antenna signal to realize the electromagnetic touch function of the display panel. In this way, the cost is reduced, and the integration of the display panel is enhanced. Compared with the electromagnetic touch screen in the prior art, in the present embodiment, the touch function and the display function may be integrated in the same layer, and can be realized using the idle terminals of the circuit units. Therefore, an inductive touch screen can be thinner and can have simple lines, thereby effectively reducing the production cost. The electromagnetic touch display panel provided in the embodiment of the present disclosure are described in detail above. The principles and implementations of the present disclosure are described through specific examples in this specification, and the descriptions of the embodiments are only intended to help understand the technical solutions and core ideas of the present disclosure. Modifications may still be made to the technical solutions described in the foregoing embodiments, or equivalent replacements may be made to the part of the technical features; and these modifications or replacements will not cause the essence of corresponding technical solutions to depart from the scope of the technical solutions in the embodiments of the present disclosure.

What is claimed is:

1. An electromagnetic touch display panel, comprising:
   a substrate, comprising a display area and a binding area;
   a circuit board, disposed in the binding area and comprising a first signal terminal and a second signal terminal;
   a display trace, extending from the display area to the binding area and connected to the first signal terminal configured to transmit a display signal; and
   an antenna trace, extending from the display area to the binding area and connected to the second signal terminal configured to transmit an antenna signal,
     wherein the antenna trace comprises at least one first antenna and at least one second antenna intersecting and insulated from the first antenna,
     wherein the first antenna comprises:
       more than two first sub-antennas, each vertically or bendably extending in the binding area, extending in the display area in a vertical direction, and arranged at intervals in a horizontal direction, and
       one first main antenna, bendably extending in the binding area, extending in the display area in a horizontal direction, and disposed close to an edge of the display area,
     wherein the more than two first sub-antennas are all connected to the first main antenna to configure as a first antenna loop.

2. The electromagnetic touch display panel as claimed in claim 1, wherein the second signal terminal comprises:
   a first touch signal terminal, connected to the first antenna; and
   a second touch signal terminal, connected to the second antenna, wherein
   the first touch signal terminal and the second touch signal terminal are located on two sides of the first signal terminal.

3. The electromagnetic touch display panel as claimed in claim 1, wherein the second antenna comprises:
   more than two second sub-antennas, each bendably extending in the binding area, extending in the display area in a horizontal direction, and arranged at intervals in a vertical direction; and
   a second main antenna, bendably extending in the binding area, extending in the display area in a vertical direction, and disposed close to an edge of the display area, wherein
   the more than two second sub-antennas are all connected to the second main antenna to configured as a second antenna loop.

4. The electromagnetic touch display panel as claimed in claim 1, wherein the circuit board comprises:
   at least one first circuit unit and a plurality of second circuit units disposed on two sides of the first circuit unit, wherein any one of the first circuit unit and the second circuit units comprises the first signal terminal and the second signal terminal, and wherein
   the antenna trace is connected to the second signal terminal of the first circuit unit and the second signal terminals of the second circuit units.

5. The electromagnetic touch display panel as claimed in claim 1, wherein the circuit board comprises:

at least one first circuit unit and a plurality of second circuit units disposed on two sides of the first circuit unit, wherein the first circuit unit comprises the first signal terminal, and each of the second circuit units comprises the first signal terminal and the second signal terminal, and wherein the antenna trace is connected to the second signal terminals of the second circuit units.

6. The electromagnetic touch display panel as claimed in claim 4, wherein the circuit board further comprises:
at least one third circuit unit, disposed on a side of each second circuit unit away from the first circuit unit, wherein the third circuit unit comprises a third signal terminal and a fourth signal terminal, and the third signal terminal and the fourth signal terminal are both connected to the display trace.

7. The electromagnetic touch display panel as claimed in claim 6, wherein the electromagnetic touch display panel comprises a scan driving unit disposed on a side edge of the display area and connected to the circuit board, and the display trace comprises:
at least one data line; and
at least one scanning line, intersecting and insulated from the data line, and wherein
the data line is connected to the first signal terminal and the third signal terminal, the scanning line is connected to the scan driving unit, and the scan driving unit is connected to the fourth signal terminal.

8. The electromagnetic touch display panel as claimed in claim 6, wherein
a line layer of the first circuit unit, a line layer of the second circuit unit, and a line layer of the third circuit unit are disposed in a same layer.

9. The electromagnetic touch display panel as claimed in claim 6, wherein
a line layer of the first circuit unit and a line layer of the second circuit unit are disposed in a same layer, and the line layer of the first circuit unit and a line layer of the third circuit unit are disposed in different layers, and wherein
a height difference between the line layer of the third circuit unit and the line layer of the first circuit unit is less than 3 μm.

10. The electromagnetic touch display panel as claimed in claim 5, wherein the circuit board further comprises:
at least one third circuit unit, disposed on a side of each second circuit unit that is away from the first circuit unit, wherein the third circuit unit comprises a third signal terminal and a fourth signal terminal, and the third signal terminal and the fourth signal terminal are both connected to the display trace.

11. The electromagnetic touch display panel as claimed in claim 10, wherein the electromagnetic touch display panel comprises a scan driving unit disposed on a side edge of the display area and connected to the circuit board, and the display trace comprises:
at least one data line; and
at least one scanning line, intersecting and insulated from the data line, and wherein
the data line is connected to the first signal terminal and the third signal terminal, the scanning line is connected to the scan driving unit, and the scan driving unit is connected to the fourth signal terminal.

12. The electromagnetic touch display panel as claimed in claim 10, wherein
a line layer of the first circuit unit, a line layer of the second circuit unit, and a line layer of the third circuit unit are disposed in a same layer.

13. The electromagnetic touch display panel as claimed in claim 10, wherein
a line layer of the first circuit unit and a line layer of the second circuit unit are disposed in a same layer, and the line layer of the first circuit unit and a line layer of the third circuit unit are disposed in different layers, and wherein
a height difference between the line layer of the third circuit unit and the line layer of the first circuit unit is less than 3 μm.

* * * * *